350-96.25 SR
XR 3,275,743
SEARCH ROOM
SUBSTITUTE FOR MISSING XR

INVENTOR
JOHN E. CONANT

BY Hurwitz & Rose
ATTORNEYS

INVENTOR
JOHN E. CONANT

BY Hurwitz & Rose
ATTORNEYS

1

3,275,743
WIDE ANGLE TELEVISION SYSTEM UTILIZING OPTICAL FIBERS
John E. Conant, Arlington, Va., assignor to Melpar, Inc., Falls Church, Va., a corporation of Delaware
Filed Dec. 17, 1963, Ser. No. 331,248
12 Claims. (Cl. 178—5.2)

The present invention relates to television systems and more particularly to a television system for scanning a wide angle field with a single camera and providing a wide angle display with a single receiver tube.

For applications, such as teaching and view simulation, it is desirable to provide a wide angle television image (having a 180° solid angle, e.g.), to an individual or group of viewers. This implies the use of a wide angle pickup and display comprising the interior of a segmented sphere, e.g. a semi-hemispherical screen. In the past, the problem of wide angle television has generally been solved by utilizing a plurality of conventional camera tubes in conjunction with a like plurality of receiver projection systems. Each camera tube scans a predetermined area being monitored and transmits a signal to one of the receivers. Each receiver covers a predetermined area of the projection screen so that, together, all of the receivers provide a continuous television picture that is a mosaic of the small solid angle views deriving from the separate receivers. Of course, such an arrangement is undesirable because it is expensive and cumbersome. Further, it is difficult to align the cameras and receivers so that there is no distortion, overlap, or separation between adjacent images.

According to the present invention, these disadvantages are overcome by utilizing a single camera in combination with a single projector at the receiver. The camera and projector each necessarily employ a wide angle lens, such as a hemispherical lens that is used to cover a 180° solid angle. Such a lens, however, introduces image distortion, whereby the image deriving from the edge of the lens is contracted relative to the image deriving from its center. To compensate for this distortion, separate pickups, transmission channels and electrical to optical transducers at the receiver are provided for many radial segments of the circular image deriving from the spherical lens of the camera tube. To reduce the number of pickups, channels and transducers to a minimum, the circular image is rotated by a lens system past an array of pickups which form a single straight line extending between the center and periphery of the image.

High resolution is attained by employing a linear array of fiber optic rods on which the rotating image is focused. Each rod in the array is coupled to a photoelectric element that generates an electric signal indicative of the impinging light radiation. The signal deriving from each photoelectric element is transmitted via a separate channel to a projection receiver. Because plural channels are employed, the need for high frequency transmission, such as is necessary for a high resolution single channel scanning television, is avoided.

The receiver includes an electro-optical transducer in the form of an electrical signal-responsive light modulator for each channel. The light modulated by each of these transducers is directed upon corresponding ends of a plurality of optical fibers whose other ends are arranged in a linear array. The receiver array of fiber optic elements is such that the light image emerging therefrom is identical with the optical image impinging on the transmitter fiber optic array. To rectify the changing linear image generated by the receiver fiber optic array, i.e. to present an image having constant apparent aspect, a rotating prism is provided at the receiver. The image formed by the rotating prism is coupled to a wide angle spherical lens from which it is projected onto a screen shaped as a segmented sphere. By utilizing this multichannel, rotating image apparatus, all views between the periphery and center of the transmitter lens are faithfully reproduced at the transmitter with a minimum of distortion. Radial distortion is eliminated because views at different radii from the transmitter optical axis are transmitted via different channels.

2

An added, but non-essential, feature of the invention involves color image projection. Color projection is attained by employing a rotating color disc in the camera and receiver tubes. The discs, which include three adjacent pie shaped filters, one for each primary color, are rotated at one third the speed of the image to provide the necessary color mixture.

It is accordingly an object of the invention to provide a new and improved wide angle television and receiver system.

It is another object of the invention to provide a wide angle (e.g. 180° solid angle) television system wherein only one camera tube and one projector tube are required.

A further object is to provide a new and improved television camera tube, particularly adapted for deriving signals indicative of a wide angle optical field (e.g. 180° solid angle).

An additional object is to provide a new and improved television receiver, particularly adapted for projecting wide angle (e.g. 180° solid angle) optical views.

Yet a further object of the invention is to provide a wide angle television system employing wide angle (e.g. 180° solid angle) spherical lenses at the receiver and transmitter but wherein image distortion introduced by such lenses is virtually cancelled.

Still another object of the invention is to provide a new and improved wide angle color television system.

An additional object is to provide a new and improved wide angle television system that provides a highly realistic image, is relatively inexpensive, is not cumbersome and does not require optical alignment of several separate images since a single image is generated for the entire field of vision.

The above and still further objects, features and advantages of the present invention will become apparent upon consideration of the following detailed description of one specific embodiment thereof, especially when taken in conjunction with the accompanying drawings, wherein.

Figure 1:
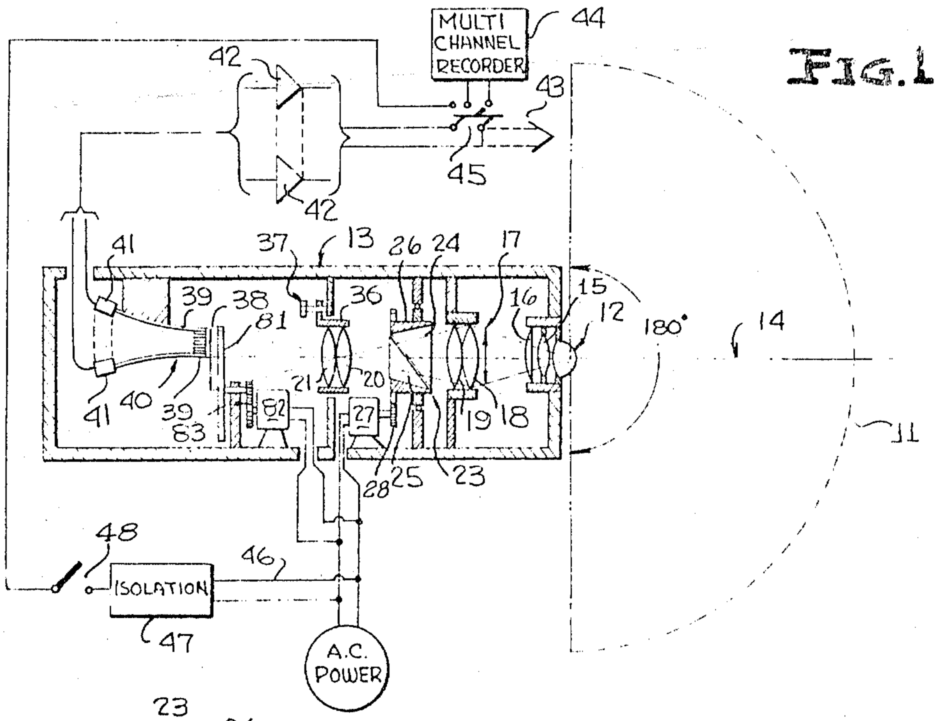
FIGURE 1 is a side sectional view of a preferred embodiment of the camera tube according to the present invention.

Reference is now made to FIGURE 1 of the drawing wherein hemispherical image 11 is focused on 180° spherical, solid angle, field of view objective lens 12 mounted in an aperture of camera tube 13. Positioned immediately behind and aligned with the optical axis 14 of lens 12 are double convex and plano-convex lenses 15 and 16 which diverge the image deriving from lens 12 into planar, real circular image 17. Image 17 is converged and focused onto double convex lenses 20 and 21 by double convex lenses 18 and 19, each of lenses 18–21 having its optical axis aligned with axis 14. Disposed between and aligned with lenses 18, 19 and 20, 21 is prism 23, including a pair of mating segments 24 and 25. Prism 23 is mounted in housing 26 and driven by synchronous motor 27 through gearing 28 at a constant rate of 15 cycles per second.

Figure 2:
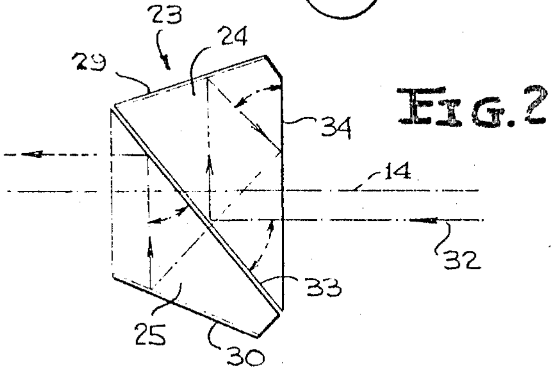
FIGURE 2 is a side view of the rotating prism of FIGURE 1.

As seen in FIGURE 2, exterior surfaces 29 and 30 of prism 23 are silvered to form mirrors. A typical light beam 32, which is approximately parallel to axis 14, enters prism 23 from lens 19 and is reflected upwardly at mating surface 33 between segments 24 and 25, as illustrated by the dashed line. Upward reflection occurs because the angle of incidence of beam 32 on surface 33 is slightly less than the critical angle for total reflection. The upwardly directed beam is reflected from mirrored surface 29 onto front surface 34 from which it is reflected onto bottom mirrored surface 30. Because the light beam propagated between surfaces 30 and 34 passes at substantially a right angle through surface 33, there is no reflection at the latter surface. The beam reflected from surface 30 is further reflected at junction 33 and is propagated from prism 23 towards lens 20 at a distance from axis 14 approximately equal to the distance between the axis and beam 32, but on the opposite side of the axis. It is thus seen that there are an odd number of reflections in prism 23 between its input and output surfaces.

As is well known, an image reflected an odd number of times by a rotating prism rotates at a rate twice that of the prism. Thus, in the present device, the image deriving from prism 23 rotates at 30 cycles per second, a rate in excess of human persistence of vision.

Figure 4:
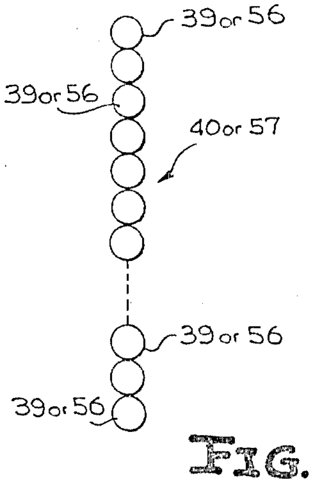
FIGURE 4 is a front view of the receiving ends of the fiber optic bundle of FIGURE 1 and the projection ends of the bundle of FIGURE 3.

The rotating image deriving from prism 23 is focused by relay lenses 20 and 21 which are adjusted in longitudinal position by screw 37 that controls the location of lens mounting 36. Mounting 36 is positioned until a real planar image 38 is formed at the polished, light receiving ends of rods 39 in fiber optic bundle 40. As seen from FIGURES 1 and 4, the ends of rods 39 on which image 38 is focused are arranged in a linear array having a length of approximately two inches and extending radially from optical axis 14 to the periphery of image 38. Each rod is approximately 10 microns in diameter at the end where image 38 is formed to provide the necessary degree of image resolution.

The light pattern picked up by each fiber optic rod 39 is transmitted to a separate photoelectric pickup 41, preferably solid state photodiodes of the diffused silicon type. Each of pickups 41 produces a voltage directly proportional to the light intensity impinging on it, which voltage is applied to a respective one of amplifiers 42.

The output signals of amplifiers 42 are selectively coupled by switch 45 to a multi-channel low frequency transmission line 43 or multi-channel low frequency tape recorder 44. One channel of line 43 and of recorder 44, as well as one set of contacts in switch 45 is provided for each of amplifiers 42. If it is desired to transmit instantly the image 11 viewed by the camera tube, switch 45 is activated to connect the outputs of amplifiers 42 to line 43. If, however, image 11 is to be utilized at some later time, the electrical signals representative thereof may be stored, for example on magnetic tape, by connecting the outputs of amplifiers 42 to recorder 44 via switch 45.

To provide synchronization between motor 27 and a similar synchronous motor at the receiver, the A.C. line voltage supplied to motor 27 is coupled in parallel to a further channel of transmission link 43 or recorder 44 via leads 46, isolating stage 47 and switch 48. If the receiver and transmitter are simultaneously supplied from the same power source, as would frequently be the case if the image acquisition and reproduction system were used in conjunction with aircraft flight simulation and training, this channel need not be used since the transmitter and receiver motors are driven in synchronism by the A.C. line voltage.

Figure 3:
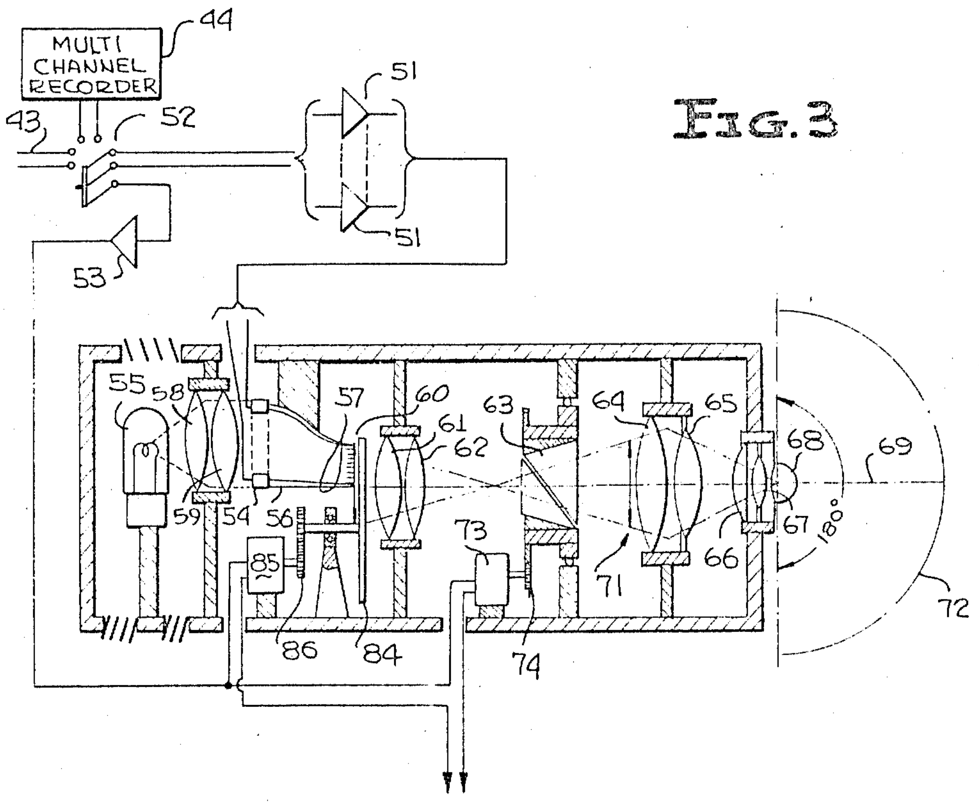
FIGURE 3 is a side sectional view of a preferred embodiment of the projection apparatus according to the present invention.

To reconvert the electrical signal deriving from amplifiers 42 into a 180° solid angle optical image, the projection tube of FIGURE 3 is employed. The image content signal obtained from link 43 or recorder 44 is applied to high gain amplifiers 51 via switch 52 while the A.C. timing wave is applied through the same switching arrangement to power amplifier 53. Of course, there is a one to one correspondence between amplifiers 51 and the channels of recorder 44 and link 43. The signals deriving from amplifiers 51 are applied to voltage responsive light valves or modulators 54, such as Kerr cells, coupled between high intensity projection lamp 55 and the light receiving ends of rods 56 in fiber optic lamps 55. Disposed between bundle 57 and valves 54, are double convex lenses 58 and 59 that collimate the light beam emanating from lamp 55 so that substantially parallel rays impinge on valves 54.

The modulated light waves impinging on the polished receiving ends of rods 56 are transmitted to the other ends of the rods. At the output ends of bundle 57, real image 60 identical with image 38 at the light receiving or input ends of rods 39 is formed since there is a one to one correspondence in position of rods 39 and 56 at their input and output ends, respectively. As viewed in FIGURES 3 and 4, the image forming end of bundle 57 comprises a straight line of fiber optic rods 56, each of which is approximately 10 microns in diameter.

Image 60 deriving from bundle 57 is optically transmitted through a lens system comprising double convex lenses 61, 62, rotating prism 63, double convex lenses 64, 65, planoconvex lens 66, double convex lens 67 and 180° solid angle spherical lens 68. All of these lenses have a common axis 69 that is coincident with the lowest surface of the output end of fiber optic bundle 57. It is thus seen that the projector lens system substantially corresponds to the lens system of the camera pickup device of FIGURE 1, so that real planar image 71 is formed immediately in front of lens 64 and a real hemispherical image of the original scene viewed by the objective lens of the camera pickup device is projected on screen 72.

To rotate changing linear image 60 into an undistorted circular image, prism 63, of identical construction to prism 23 (FIGURES 1 and 2), is rotated at 15 cycles per second by synchronous motor 73 and gearing 74. Motor 73 is driven by amplifier 53 or the A.C. power line in synchronism with motor 27 so that the two motor speeds are identical when the same images are passing through prisms 23 and 63.

Figure 5:
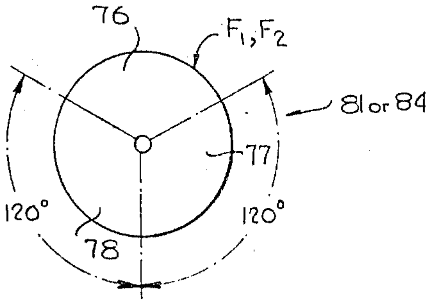
FIGURE 5 is a front view of the color wheels employed in FIGURES 1 and 3.

If it is desired to project a color, rather than a black and white image, the camera and projector are provided with color wheels of the type illustrated in FIGURE 5. The wheel is divided into three equal segments 76, 77 and 78, each of which subtends an arc of 120°. Each of segments 76–78 consists of a separate primary color filter, whereby segments 76, 77, 78 enable only red, blue and green light, respectively, to be transmitted through them.

In the camera tube, color wheel 81 is positioned between the image receiving ends of bundle 40 and lens 21 and is driven at 5 cycles per second by synchronous motor 82 and gearing 83. The position of disc 81 is such that only one of its segments is in front of the light receiving ends of bundle 40 at a time. Disc 84, driven by synchronous motor 85 and gearing 85, is similarly driven and located in the projector tube. To provide speed and position sync between discs 81 and 84 an additional channel is provided between the camera and projector. In this channel, timing pulses are generated once for each revolution of wheel 81. These pulses control the angular position of the shaft of motor 85 such that like color segments of discs 81 and 84 are always responsive to the same image. The speeds of discs 81 and 84 are maintained the same for identical images by energizing motors 27 and 82 from the same A.C. supply and by energizing motors 73 and 85 in parallel from amplifier 53.

Figure 6:
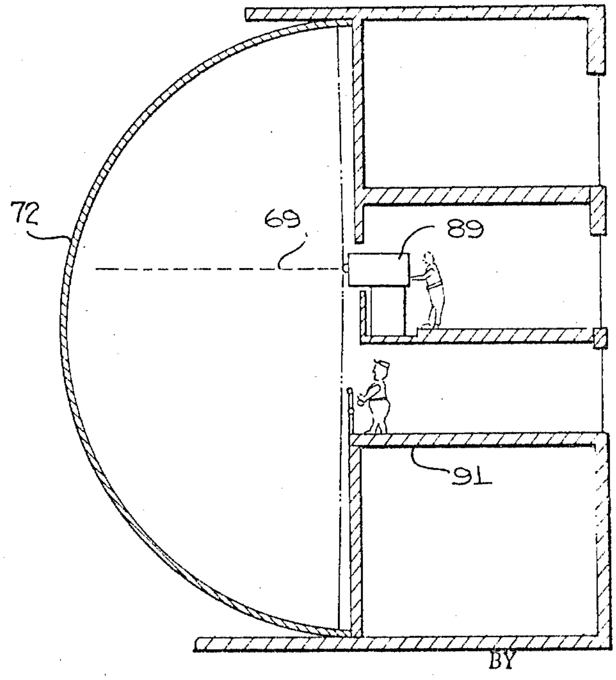
FIGURE 6 is a side sectional view of a projection room adapted for use with the projection tube of FIGURE 4.

A preferred apparatus for viewing the image deriving from the projector of FIGURE 3 is illustrated in FIGURE 6. Projector 89 is located with its optical axis 69 at the center of semi-hemispherical projection screen 72. The audience is in booth 91 immediately below projector 89, located as close as possible to the center of screen 72. In consequence, the image projected onto screen 72 appears to the viewer in booth 91 substantially identical to the scene viewed by spherical, 180° solid angle lens 12.

The operation of the system is as follows for black and white transmission. Light rays emanating from the scene encompassed in the 180°-degree solid angle field of view of lens 12 form a real, plane circular portion of the image 17 having radial distortion, as described supra. Image 17 is rotated at a speed of 30 c.p.s. by prism 23 and the rotating image is focused as image 38 on the input ends of fiber optic bundle 50 by lenses 18–21. Since bundle 40 is formed as a linear array extending radially from the center of image 38 to its periphery, the changing image to which each rod 39 is subjected represents the light intensity of image 11 at a particular radius and angle. As image 38 rotates, the input to each rod 39 remains on the same radius of image 11 but the relative azimuth of image 11 changes.

The light images picked up by rods 39 are electrically transmitted to the projector of FIGURE 3 in response to the signal deriving from photocells 41. At the projector, each signal is separately applied to light valves 54 to control the light intensity picked up by rods 56. Thus, if an intense light impinges on the most radial of rods 39, valve 54, for the most radial of rods 56, opens to a large extent. Thereby, a large quantity of light from lamp 55 impinges on the most radial of rods 56. In consequence, there is formed a constantly changing light pattern at the output end of bundle 57 such that the radial position of each rod 56 corresponds with the distance of a particular segment of image 11 from axis 14. The occurrence time of each image deriving from bundle 57 is a function of the angle of the particular segment from a reference half plane originating at and including axis 14.

Lenses 61, 62 and prism 63 transform linear image 60, at the output end of bundle 57, into plane circular image 71. Image 71 has the same radial distortion as image 17 since corresponding image segments are derived at the input and output ends of bundles 40 and 57, respectively, and motors 27 and 73 are synchronized. Because image 71 is projected from lens 68 onto semihemispherical screen 72 and spherical lenses 12 and 68 have identical characteristics, radial distortion is removed.

In color transmission, wheel 81 at the camera successively allows only the red, green and blue light components to reach rods 39 whereby the signal amplitude deriving from amplifiers 42 is varied as a function of color. Since wheels 81 and 84 are synchronized, the primary colors passing through segments 76–78 of the latter have the same intensity as those passing through the former for the same screen segment. The primary colors deriving from wheel 84 are projected on screen 72 and are mixed by the human eye to form a magnified, color reproduction of image 11.

While I have described and illustrated one specific embodiment of my invention, it will be clear that variations of the details of construction which are specifically illustrated and described may be resorted to without departing from the true spirit and scope of the invention as defined in the appended claims.

I claim:

1. A wide angle television system, comprising a camera pickup device having an optical axis; said camera pickup device including, along said optical axis: lens means for forming a real image of a scene, encompassed in a wide angle field of view, to be televised by said system; means for rotating said image about said axis; an array of optical waveguide elements disposed in light-receiving relationship with said image-rotating means, each having its light-receiving end disposed at a different point along a radial line normal to and extending from said axis to a point adjacent the periphery of the rotating image, whereby to simultaneously transmit light rays constituting contiguous elements of a lineal portion of said rotating image, a sequence of such lineal portions for a complete rotation of the image constituting the total image during a given interval of time; and photodetector means for converting light rays transmitted by each optical waveguide element to a respective electrical signal proportional to light ray intensity, to generate parallel signals containing the video information in a lineal portion of the total image.

2. The system according to claim 1, further including means for storing said parallel signals.

3. The system according to claim 1, further including a projector having an optical axis, said projector including, along said axis, a plurality of light valves each responsive to a separate one of said parallel signals for modulating the intensity of light passing therethrough in accordance with the video informational content of said signals, a source of light, means for collimating the light emanating from said source to project a multiplicity of parallel light rays upon said plurality of light valves, a further array of optical waveguide elements disposed in contiguous relationship, with light-emerging ends aligned along a radial line extending from the optical axis of said projector and associated with respective ones of said light valves, for transmitting the modulated light rays emerging from said valves, lens means for reforming said lineal portions of said image from the modulated light rays transmitted by said optical waveguide elements, means for rotating said reformed lineal image portions about the optical axis of said projector to reconstruct the light pattern constituting the total image of said scene; and means for applying said parallel signals to said plurality of light valves.

4. The system according to claim 3 including means for synchronizing the rotation of the image-rotating means of said camera pickup device and said receiver.

5. The system according to claim 4 including a separate rotatable segmented color filter disposed along the respective optical axis of each of said camera pickup device and said projector for passing light of preselected colors therethrough; and means for synchronously rotating said color filters at a fraction of the speed of rotation of said image-rotating means corresponding to the reciprocal of the number of distinct filter segments in each of said color filters.

6. A wide angle television system, comprising:

(a) a camera having an optical axis and including, along said axis, (1) an objective lens having a hemispheric solid angle field of view for viewing scenes encompassed in said field of view, (2) at least one transfer lens for forming a real image of said scene, (3) a rotatable prism having an axis of rotation coincident with said optical axis and having an odd number of reflecting surfaces for inverting and rotating the light pattern constituting said image, (4) a plurality of optical fibers arranged in contiguous relationship substantially normal to and along radial line extending from said axis, for transmitting light rays associated with contiguous portions of the rotating image incident thereon, and (5) a plurality of photoelectric elements, each associated with a distinct and different one of said optical fibers for converting the light rays transmitted by the respective optical fibers to an electrical signal proportional to the intensity thereof;

(b) a projector having an optical axis and including, along said axis, (1) a projector lamp, (2) a plurality of light modulating devices each responsive to a separate one of said electrical signals for modulating the intensity of light incident thereon in accordance with the respective signal, (3) means for collimating the light emanating from said lamp into a plurality of rays incident on said light modulating devices, (4) a further plurality of optical fibers arranged in contiguous relationship substantially normal to and along a radial line extending from the optical axis of the projector, each associated with a distinct and different light modulating device for transmitting the modulated light rays emerging from said modulating devices, (5) a further rotatable prism having an odd number of reflecting surfaces and having an axis of rotation coincident with the optical axis of said projector, for rotating the modulated light rays emanating from said optical fibers to reform the light pattern constituting said image, and (6) lens means for projecting said reformed light pattern on a display;

(c) means for applying the signals generated by said photoelectric elements in parallel to respective ones of said light modulating devices; and (d) means for synchronously rotating said prisms.

7. The system according to claim 6 wherein said means for applying includes means for storing said signals.

8. The system according to claim 6 wherein is included along the optical axis of each of said camera and said projector, a rotatable color filter disc having segments for selectively passing light of different colors, and means for synchronously rotating the color filter disc of each of said camera and said projector at approximately one-third the speed of rotation of said prisms.

9. A wide angle television camera having an optical axis and including, along said axis, (a) an objective lens having a wide angle field of view, (b) a prism rotatable about said optical axis and having an odd number of light reflecting surfaces, (c) at least one transfer lens for directing a light pattern representative of an objective encompassed in said field of view on said prism, (d) a plurality of optical fibers arranged in side-by-side relationship with light-receiving ends aligned along a radial line extending from said optical axis to a point adjacent the periphery of the rotating light pattern emerging from said prism, and (e) a plurality of photoelectric detectors arranged in one-to-one correspondence with said optical fibers at the light-emerging ends thereof for generating parallel electrical signals proportional to the intensity of light transmitted by the respective optical fiber.

10. The camera of claim 9 further comprising a color filter disc disposed along said optical axis for selectively passing light intensities dependent upon the primary color intensities incident thereon, and synchronous motor means for rotating said disc at one third the speed of said prism.

11. A wide angle projector having an optical axis and including, along said axis, (a) a plurality of light valves each responsive to electrical signal applied thereto for modulating the intensity of light passing therethrough in accordance with the level of said signal, (b) a plurality of optical fibers each having a light-receiving end associated with a respective one of said light valves and each having its opposite end aligned in contiguous relationship with the opposite end of each of the other optical fibers along a radial line extending from said optical axis, (c) a source of light, (d) means for collimating the light emanating from said source and for directing the parallel rays resulting from said collimation on said plurality of light valves, (e) a prism rotatable about said optical axis for rotating the light pattern produced by modulated light rays emanating from said optical fibers, and (f) lens means for projecting the rotating light pattern on a display screen to produce an image in accordance with the video information contained in said electrical signals.

12. The projector according to claim 11 further comprising a color filter disc disposed along said optical axis, said disc selectively passing light intensities dependent upon the primary color intensities incident thereon, and synchronous motor means for rotating said disc at one third the speed of said prism.

References Cited by the Examiner

UNITED STATES PATENTS

| | | | |
|---|---|---|---|
| 2,185,302 | 1/1940 | Karolus. | |
| 3,210,468 | 10/1965 | Trott | 178—6 X |
| 3,212,100 | 10/1965 | Buck | 178—6 X |

DAVID G. REDINBAUGH, *Primary Examiner.*

R. L. RICHARDSON, *Assistant Examiner.*